United States Patent [19]

Yabu et al.

[11] 4,338,640
[45] Jul. 6, 1982

[54] SPEED CONTROL SYSTEM FOR A MULTIPLE SPEED TAPE RECORDING AND REPRODUCING APPARATUS

[75] Inventors: Toshiomi Yabu; Tatsuo Wada; Masaru Hashirano; Kouichi Yamada, all of Kadoma, Japan

[73] Assignee: Matsushita Electric Industrial Co., Ltd., Osaka, Japan

[21] Appl. No.: 122,102

[22] Filed: Feb. 15, 1980

[30] Foreign Application Priority Data

Feb. 19, 1979 [JP] Japan .................................. 54/18177

[51] Int. Cl.³ ........................ G11B 15/46; G11B 19/28
[52] U.S. Cl. ...................................... 360/73; 318/318
[58] Field of Search ................... 360/73, 70, 71, 74.4; 318/311, 314, 318

[56] References Cited

U.S. PATENT DOCUMENTS

| | | | |
|---|---|---|---|
| 3,702,382 | 11/1972 | Brelkss | 360/73 |
| 3,772,468 | 11/1973 | Tatsuguchi | 360/73 |
| 3,939,490 | 2/1976 | Opelt | 360/70 |
| 3,990,108 | 11/1976 | Suga et al. | 360/73 |
| 4,044,389 | 8/1977 | Oldershaw et al. | 360/73 |
| 4,104,684 | 8/1978 | Wakami | 360/73 |
| 4,212,039 | 7/1980 | Koda | 360/73 |
| 4,232,257 | 11/1980 | Hashberger, Jr. | 360/73 |
| 4,249,220 | 2/1981 | Yasutake et al. | 360/73 |

Primary Examiner—Alfred H. Eddleman
Attorney, Agent, or Firm—Pollock, VandeSande & Priddy

[57] ABSTRACT

A tape speed control system for a multiple speed tape recording and reproducing apparatus comprising a transducer head for reproducing a tape speed indicative signal which has been recorded along an edge of a recording tape. The frequency of the reproduced speed indicative signal is compared with a plurality of reference values to determine to which one of separate frequency bands the frequency of the reproduced speed signal belongs. If the latter belongs to the frequency band other than the frequency band which includes a predetermined frequency derived when the playback speed equals to the recording speed, a corresponding motor drive signal is generated to vary the speed of the tape until the frequency of the reproduced speed signal reaches the predetermined frequency.

6 Claims, 8 Drawing Figures

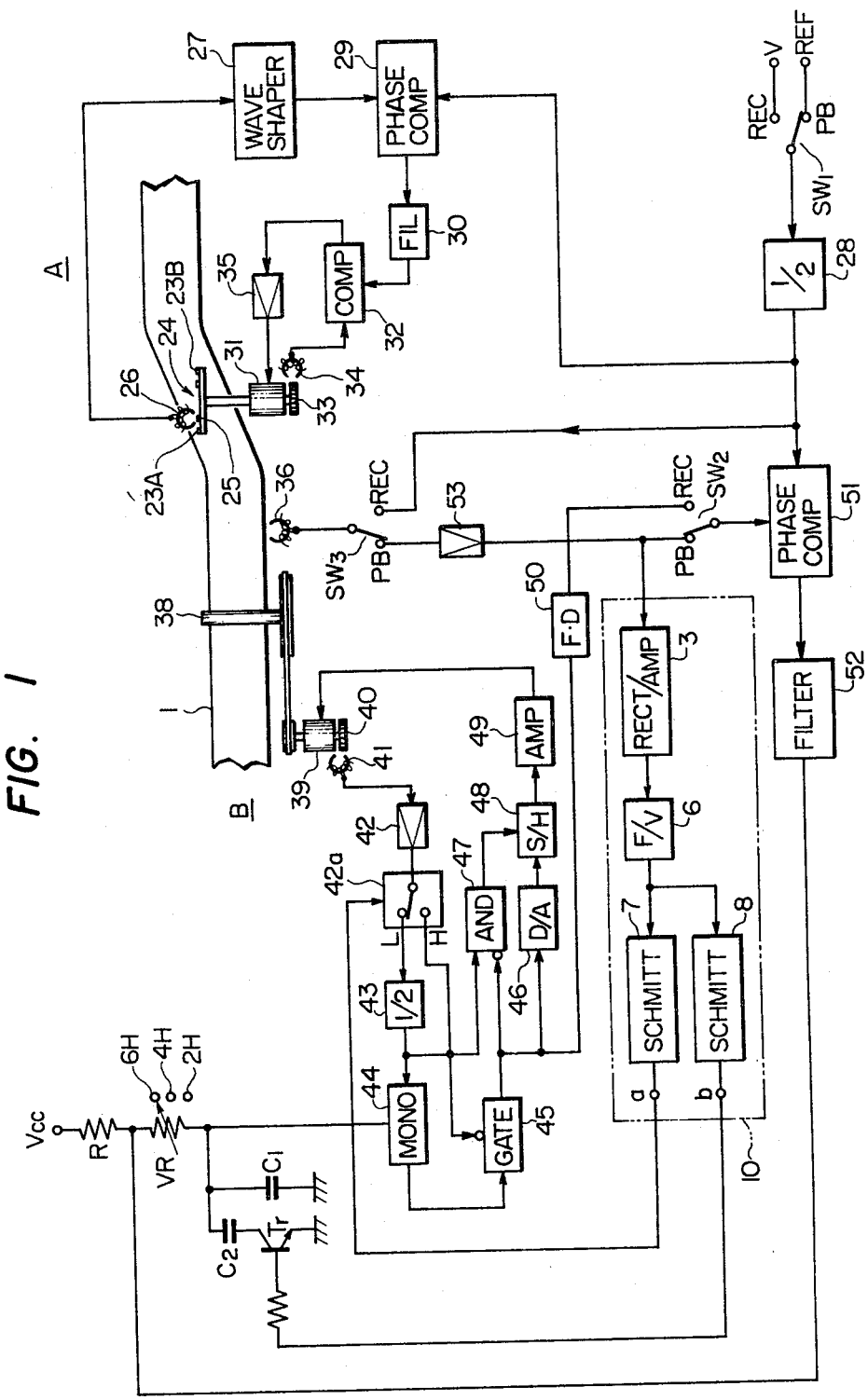

SPEED CONTROL SYSTEM FOR A MULTIPLE SPEED TAPE RECORDING AND REPRODUCING APPARATUS

BACKGROUND OF THE INVENTION

The present invention relates generally to tape recorders and in particular to tape recorders of the type having a plurality of tape transport speeds during recording and playback modes. More specifically, the invention relates to a tape speed control system for the multiple speed tape recording and reproducing apparatus wherein the tape speed is automatically readjusted to a desired speed during playback operation when recorded materials of different tape speeds are successively reproduced.

Multiple speed video tape recorders are currently available to permit recording of materials of different time lengths on a single cassette tape in response to user's choice. For example, at the highest speed a material of 2 hours is recorded on a single tape, at the medium speed the same tape can record a material of 4 hours and at the lowest speed the recording time length is extended to 6 hours. It is often the case wherein a plurality of materials of different recording speeds are recorded on a single cassette tape. When this tape is reproduced, the tape speed must be readjusted to the speed of the material that comes into the playback position subsequent to the previously played material. Since this speed readjustment is currently effected manually, the user's attention is called upon each time he encounters the subsequent material of different recording mode from the preceding material.

SUMMARY OF THE INVENTION

Accordingly, an object of the present invention is to provide a tape speed control system which automatically readjusts the tape transport speed during the playback operation as it successively encounters recorded materials of a different tape speed from the preceding one.

Another object of the invention is to provide a tape speed control system which detects the frequency of a speed reference signal recorded along an edge of the tape being reproduced and readjust the tape speed in response to the direction of deviation of the detected frequency value from a plurality of reference values.

In accordance with an embodiment of the invention, the speed control system comprises a transducer head for reproducing a speed control signal recorded along an edge of a magnetic recording tape during the playback mode. The video tape recorder has at least three different tape speeds having ratios of 1:2:3, whereby a predetermined frequency is generated from the transducer head when the playback speed equals the recording speed or one of six different frequencies is generated when the two speeds differ from each other. A tape speed control circuit is connected to respond to the reproduced speed control signal by generating one of three motor drive signals. This control circuit establishes a plurality of reference values representing first, second and third reference frequencies to define first, second, third and fourth separate frequency bands in the order from low to high frequency values, with the third frequency band including the predetermined frequency. The frequency of the reproduced speed control signal is compared with the reference values to determine which one of the frequency bands the reproduced frequency belongs to. If the latter belongs to the frequency band other than the third frequency band, the control circuit generates a low-speed, medium-speed or high-speed motor drive signals. This motor drive signal is received by a motor speed control negative feedback circuit which varies the speed of the tape until the frequency of the reproduced speed control signal reaches the predetermined frequency.

BRIEF DESCRIPTION OF THE DRAWINGS

These and other objects and advantages of the present invention will be understood from the following detailed description when read in conjunction with the accompanying drawings, in which:

FIG. 1 is an illustration of a schematic diagram of a video tape recorder embodying the present invention;

DETAILED DESCRIPTION

Figure 2A:
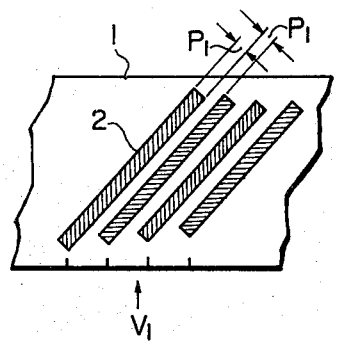
FIGS. 2A to 2C are illustrations of recorded tracks at three recording speeds.

Referring now to FIG. 1 a circuit block diagram of the tape drive system of a video tape recorder embodying the present invention is illustrated. The tape drive system generally comprises a cylinder servo system A and a capstan serve system B. The cylinder servo system A includes a rotary head cylinder 24 driven by a cylinder motor 31. On the head cylinder 24 is provided a pair of oppositely arranged transducer heads 23A and 23B and a magnetic piece 25, the latter serving as a reference marker for indicating the reference angular position of the cylinder 24 by having a transducer head 26 detect its proximity thereto. The signal from the transducer head 26 is supplied to a wave shaping circuit 27 and thence to an input terminal of a phase comparator 29 for making a comparison in phase with a reference signal derived from the output of a frequency divider 28 whose output is one-half the frequency of the vertical synchronization signal. The output of the phase comparator 29 is converted into a DC signal by means of a filter 30 and coupled to an input of a comparator 32 for comparison with a motor speed signal. The latter is derived from a transducer 34 mounted in proximity to a toothed wheel 33 secured to the rotary shaft of the cylinder motor 31. The output of the comparator 32 is applied to a motor drive amplifier 35 which feeds a drive current to the motor 31. Initially when the drive system is activated, the drive current is supplied from the amplifier 35 to accelerate the motor 31 and subsequently the rotation of the toothed wheel 33 causes a speed indicative signal to be generated by the transducer 34, the latter being compared with the DC signal from the filter 30 to provide an error signal which is fed back through amplifier 35 to the motor, so that the motor 31 is rotated in synchronism with the reference frequency which is one-half of the vertical synchronization frequency. As a result, the rotary heads 23A and 23B traverse the magnetic tape 1 in a well known manner to form slant tracks.

The capstan servo system B comprises a capstan 38, a capstan motor 39 having a toothed wheel 40, and a feedback motor drive circuit including a motor drive amplifier 49. The amplifier 49 initially supplies a large current to the motor 39 for acceleration causing a speed indicative signal to develop in a transducer 41. This signal is supplied through an amplifier 42 to an electronic switching circuit 42a and thence to an inverted input of a gate 45 or to an input of a frequency divider 43 whose output frequency is one-half of its input frequency. The output of the frequency divider 43 is coupled to a selectable pulse-width monostable multivibrator 44 whose output is connected to the gate 45. The monostable 44 is so designed that its minimum period is greater than the maximum pulse duration of the output of transducer 41. The output of the divider 43 is also applied to the inverted input of the gate 45 and to an input of an AND gate 47 which receives its other signal from the output of the gate 45 at its inverted input. This AND gate generates a pulse in response to the trailing edge of an output from the gate 45 and supplies it to a sample-hold circuit 48. A digital-analog converter 46 converts a signal from the gate 45 into a DC signal which is supplied to the sample-and-hold circuit 48. This DC signal is sampled in response to the output of the AND gate 47 and applied to the motor drive amplifier 49 to correct the speed of the capstan motor 39.

The speed of the capstan motor 39 is preadjusted manually by means of a variable resistor VR connected in a series circuit with a resistor R between a voltage supply terminal Vcc and the monostable 44. The variable resistor VR is also connected to ground through a capacitor C1 which is in shunt with a capacitor C2 which is grounded through a transistor Tr when the latter is conducting. The variable resistor VR has a set of three different positions marked 2H, 4H and 6H, respectively representing 2-hour, 4-hour and 6-hour recording, so that it provides different resistance values to determine a set of three preset values of time constant in conjunction with the capacitors C1 and C2, thus providing a set of three predetermined pulse length for the monostable 44. If the variable resistor VR is switched to the 2H position, the pulse duration of the monostable 44 has a maximum value to drive the motor at the highest preset speed.

When the drive system is in the recording mode, switches SW1, SW2 and SW3 are switched to their recording positions in which the reference frequency signal from the frequency divider 28 is supplied through switch SW3 to a recording head 36 located adjacent to an edge of the magnetic tape 1 for purposes of recording a speed control signal along the edge of the tape. During the playback mode, switches SW1 to SW3 are moved to their playback positions in which the recording head 36 serves as a pickup head for detecting the recorded speed control signal. The latter signal is applied through an amplifier 53 and thence to an input of a phase comparator 51 via switch SW2 for making a phase comparison with the reference frequency signal from the frequency divider 28. The output of the phase comparator 51 is converted into a DC signal by means of a filter 52 to derive a phase error signal for application to a circuit junction between the resistors R and VR. The application of this phase error signal causes the monostable 44 to vary its pulse duration in such a manner that the speed error is reduced to zero. This phase error control is also effected during the recording mode by applying a signal from a frequency divider 50, whose input is connected to the output of gate 45, to the phase comparator 51.

The operation of the feedback circuit for the capstan motor 39 is as follows. With the switching circuit 42a being switched to the lower position, the speed signal from the transducer 41 is applied to the inverted input of the gate 45 and to the monostable 44. The waveform of the speed signal is a train of pulses with its duration and frequency variable as a function of the speed of the motor 39, so that the output of the gate 45 is a pulse with a duration which is the difference between the duration of the pulse from the monostable 44 and the pulse from the transducer head 41. Therefore, the pulse duration of the output of the gate 45 represents the frequency of the output of the transducer 41 and hence the speed of the motor 39. The speed representative period of the output of gate 45 is converted into a DC voltage which is sampled by the sample-and-hold circuit 48 in response to the leading edge of the transducer 41 output detected by the AND gate 47 and supplied to the amplifier 49 to provide a negative feedback signal for application to the capstan motor 39. When the switching circuit 42a is switched to an upper position, the transducer 41 output is coupled to the frequency divider 43 to divide its frequency, so that the repetition frequency of the monostable 44 output is halved and hence the speed of the capstan motor 39 is doubled because of the negative feedback operation.

According to the present invention, an automatic speed control circuit 10 is provided. This circuit includes a rectifier/amplifier circuit 3 having its input connected to the output of amplifier 53 to receive the speed control signal detected from the transducer 36. Further included is a frequency-to-voltage converter 6 coupled to the output of the rectifier/amplifier 3 to convert the output of the latter into a DC voltage which is coupled to inputs of a pair of Schmitt trigger circuits 7 and 8. The output of the Schmitt trigger 7 is connected through a terminal a to the control terminal of the switching circuit 42a to control its switched positions and the output of the Schmitt trigger 8 is connected though a terminal b to the base of the switching transistor Tr. As will be described later in greater detail, the output of each Schmitt trigger circuit assumes one of high and low voltage levels depending on the level of input signals applied thereto relative to the preset threshold levels of each trigger circuit. When the output terminal a is at a low voltage level the switching circuit 42a remains switched to the upper position causing the motor 39 to be driven at a low speed. The switch 42a will be moved to the lower position in response to a high voltage output appearing at the terminal a to drive the motor 39 at twice the low speed value. Similarly, the transistor Tr is rendered conductive in response to a high voltage output appearing at the terminal b to increase the time constant value of the monostable 44 by 1.5 times the value obtained when only the capacitor C1 is connected to the monostable 44, causing the motor 39 to rotate at a reduced speed.

Figure 2B:
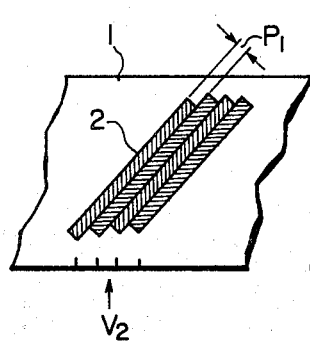
Figure 2C:
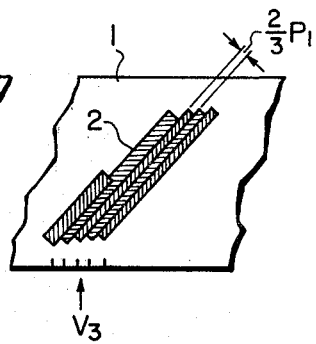

When the variable resistor VR is switched to the 2H (2-hour mode) position during recording operation, the motor 39 is driven at a speed V1 (highest speed), the recording signal is recorded on the magnetic tape 1 on different tracks 2 with the azimuth angles skewed at alternate intervals as illustrated in FIG. 2A. In this two-hour mode, a one-field video signal is recorded on each different track 2 having a width P1 which is spaced a distance P1 from adjacent tracks and the azimuth angles of adjacent tracks are skewed relative to each other. In the four-hour operational mode, the motor 39 is driven at a speed V2 so that the tracks 2 are closely spaced as shown in FIG. 2B. During the six-hour mode, the motor 39 is driven at a speed V3 (lowest speed) so that the tracks 2 are partially overlapped to create closely spaced apart tracks having a width (⅔)P1, as illustrated in FIG. 2C. Since there is a substantial value of azimuth loss between adjacent tracks due to their relatively skewed angular orientations of azimuth, the reproduced video signal is substantially free from interference which might occur between adjacent tracks.

Referring again to FIG. 1, the operation of the speed control circuit 10 will be understood as the description proceeds. As previously described, along one edge of the tape 1 is recorded a speed control pulse train which is usually at a frequency of 30 Hz regardless of the speed values of the capstan motor 39 during the recording mode. Therefore, if a tape having a material of 2-hour recording is reproduced on the 2-hour mode, the detected speed control signal will have a frequency of 30 Hz and if this material is reproduced on the 4-hour mode the frequency will be 15 Hz, and so on. Table I illustrates the frequencies of the reproduced speed control signal for different combinations of the operational modes during recording and playback operations.

TABLE I

| PLAYBACK | RECORDING MODES | | |
|---|---|---|---|
| MODES | 2-HOUR | 4-HOUR | 6-HOUR |
| 2-HOUR | 30 Hz | 60 Hz | 90 Hz |
| 4-HOUR | 15 Hz | 30 Hz | 45 Hz |
| 6-HOUR | 10 Hz | 20 Hz | 30 Hz |

The present invention contemplates to utilize the differences between the above seven different frequency values for the purposes of discriminating the recording mode and automatically adjusting the speed of the capstan motor 39 to the same speed value at which the video signal is recorded.

This frequency discrimination is effected by presetting the threshold levels of each Schmitt trigger circuit of FIG. 1 such that the output terminals a and b have the voltage levels L (low) and H (high) as listed in Table II according to different playback modes.

According to the invention, each of the Schmitt trigger circuits 7 and 8 is provided with a different set of low and high threshold levels.

TABLE II

| PLAYBACK | OUTPUT TERMINALS | |
|---|---|---|
| MODES | a | b |
| 2-HOUR | L | L |
| 4-HOUR | H | L |
| 6-HOUR | H | H |

As shown in Table III, the lower threshold level of the Schmitt trigger 7 is set at a point anywhere between the input voltages corresponding respectively to the speed control frequencies of 15 Hz and 20 Hz, and the higher threshold level is set at a point between the input voltages corresponding respectively to the speed control frequencies of 30 Hz and 45 Hz.

On the other hand, the lower threshold level of the Schmitt trigger 8 is set at a point between the input voltages respectively corresponding to the speed control frequencies of 20 Hz and 30 Hz, while its higher threshold level is set at the same point as for the Schmitt trigger circuit 7.

By virtue of the hysteresis nature of the Schmitt trigger circuit, the output condition of the terminals a and b is at a low voltage level until the input to the associated Schmitt trigger circuits rises above the higher threshold level and at a high voltage level until the input thereto reduces below their lower threshold levels.

Assuming first that a 6-hour mode tape is reproduced with the variable resistor VR being set to the 6H position, the capstan motor 39 is initially accelerated at a high speed so that the reproduced speed control signal will have a frequency of 45 Hz causing the Schmitt trigger circuits 7 and 8 to deliver high level outputs to terminals a and b, and as a result the transistor Tr is switched on and the switch 42a is switched to the lower position. Under these conditions the tape is run at the required speed of the 6-hour mode. If a 4-hour mode tape is reproduced with the variable resistor VR being set to the 4-H position, the input voltage to the Schmitt triggers 7 and 8 will exceed the higher threshold levels thereof as the frequency of the reproduced speed control signal rises above the 30 Hz value, thus resulting in the generation of high level outputs from the terminals a and b. This in turn causes the capstan motor 39 to rotate at the 6-hour mode speed, so that the motor 39 reduces its speed to a point where the frequency of the reproduced speed control signal corresponds to 20 Hz (see Table III), resulting in a=H, b=L. The transistor Tr is turned off to disconnect the capacitor C2 to increase the motor speed by 1.5 times of the previous 6-hour mode speed and the tape is thus run at the correct speed. On the other hand, upon reproduction of a 2-hour mode tape with the variable resistor VR being set to the 2-H position, the frequency of the reproduced speed control signal never exceeds the high threshold levels of the Schmitt triggers 7 and 8, and thus the conditions a=L, b=L result. Under these conditions the transistor Tr is turned off and the switch 42a is switched to the upper position to reduce the input frequency of the monostable 44 to one-half of the value obtained in the previous examples.

Therefore, it is understood that when the tape is run at the correct speed, the output conditions of the terminals a and b are as listed in Table II.

TABLE III

| REC/PLB MODE COMBINATIONS | 2/6 | 2/4 | 4/6 | 2/2 4/4 6/6 | 6/4 | 4/2 | 6/2 |
|---|---|---|---|---|---|---|---|
| FREQ. OF REPRODUCED SPD CONT. SIGNAL (Hz) | 10 | 15 | 20 | 30 | 45 | 60 | 90 |

TABLE III-continued

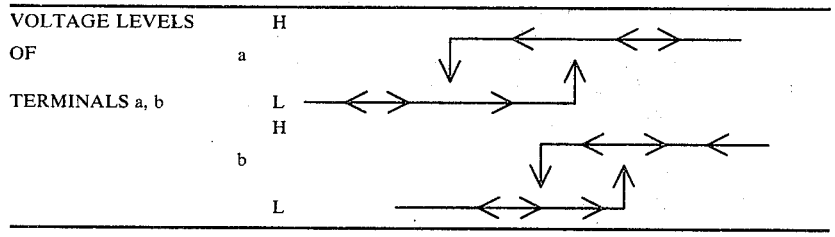

Consider now a situation in which a tape having a mixture of different modes of recorded material is reproduced. If the initially encountered material is of a 6-hour mode, a subsequently encountered material of 4-hour mode will cause the frequency of the reproduced speed control signal to change from 30 Hz to 20 Hz (see Table III) and the output conditions of terminals a and b change from a=H, b=H to a=H, b=L, so that the tape speed is automatically reset to the 4-hour mode speed by turning off the transistor Tr. If the subsequently encountered material is of a 2-hour mode, the frequency of the speed control signal reduces to 10 Hz, causing the output states of the terminals a and b to change to a=L, b=L. This turns off transistor Tr and switches the electronic switch 42a to the upper position to reduce the input frequency of the monostable 44, so that the tape speed is automatically readjusted to the 2-hour mode speed.

Consider now a situation in which the initially reproduced material is of a 4-hour mode. A subsequent encounter with a 6-hour mode recorded material will cause the frequency of the reproduced speed control signal to increase to 45 Hz. This causes the output states of terminals a and b to change from a=H, b=L to a=H, b=H, turning the transistor Tr ON and switching the switch 42a to the lower position. The tape speed is thus changed to the 6-hour mode speed. If the subsequently encountered material is of a 2-hour mode, the frequency of the speed control signal reduces to 15 Hz and the output conditions of the terminals a and b both change to L. This automatically readjusts the capstan motor speed to the 2-hour mode.

Considering further a situation in which the initially reproduced material is of a 2-hour mode. A subsequent encounter to a 6-hour mode recorded material will cause the frequency of the speed control signal to rise to 90 Hz resulting in the terminals a and b having conditions a=H, b=H. These output conditions cause the motor speed to change to the 6-hour mode speed. If the subsequently encountered material is of a 4-hour mode, the frequency of the speed control signal changes to 60 Hz resulting in the output conditions a=H, b=H. This changes the capstan motor speed to the 6-hour mode speed value and as a result the frequency of the speed control signal now changes to 20 Hz and the output conditions now change to a=H, b=L. The capstan motor speed is thus changed to the desired 4-hour mode speed.

Figure 3:
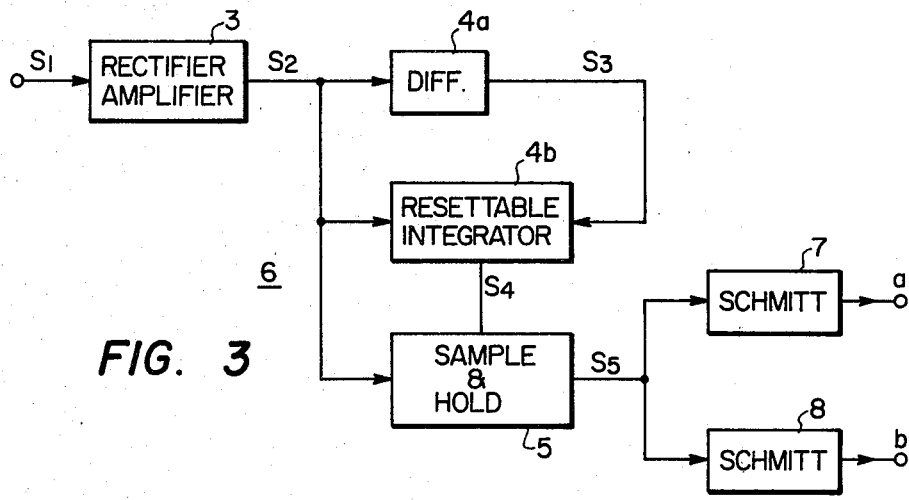
FIG. 3 is an illustration of the detail of the speed control circuit of FIG. 1.
Figure 4:
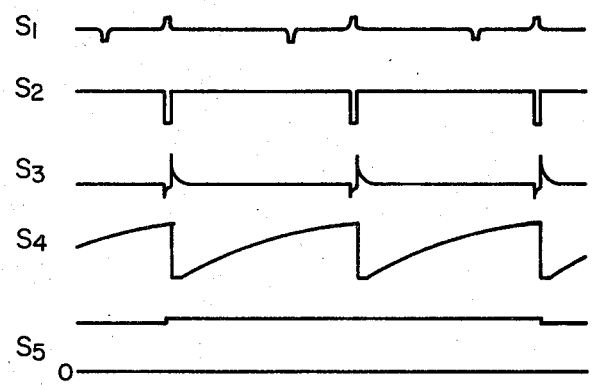
FIG. 4 is an illustration of waveforms appearing in the circuit of FIG. 3.

FIG. 3 is an illustration of the detail of the speed control circuit 10 of FIG. 1, and FIG. 4, an illustration of waveforms appearing in the circuit of FIG. 3. The reproduced speed control signal S1 has oppositely going pulses as indicated in FIG. 4. This signal is rectified by the rectifier/amplifier 3 to generate a waveform S2 which is applied to the frequency-to-voltage converter 6. The converter 6 comprises a a differentiator 4a for generating a differentiated signal S3, a resettable integrator 4b which receives its main input signal from the output of the amplifier 3 for integration with respect to time in response to a resetting signal from the output of the differentiator 4a to generate an integrator output S4, and a sample-and-hold circuit 5 which receives its main input from the integrator 4b for sampling it in response to a sampling signal S2 from the rectifier/amplifier 3 and holding the sampled signal to generate a signal S5. The output S5 of the sample-and-hold circuit 5 is applied to the Schmitt trigger circuits 7 and 8 to generate digital output signals as listed in Table II.

Figure 5:
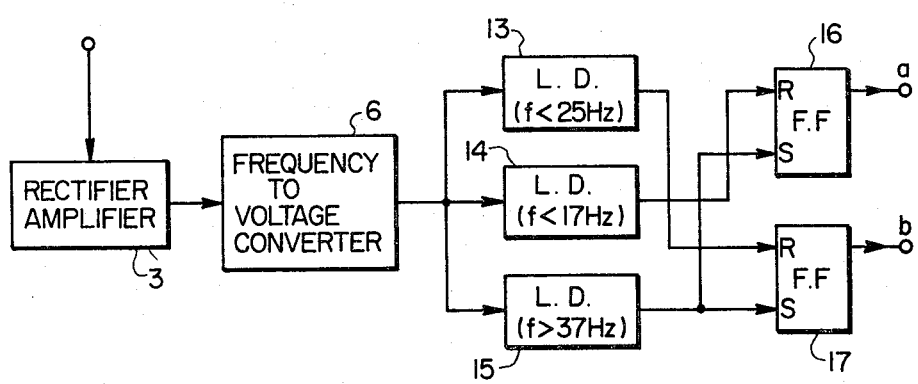
FIGS. 5 and 6 are illustrations of modifications of the circuit of FIG. 3.

FIG. 5 is an illustration of an alternative embodiment of the speed control circuit 10. This embodiment differs from the circuit of FIG. 3 in that it comprises three level detectors or comparators 13, 14 and 15, and a pair of flip-flops 16 and 17, instead of two Schmitt trigger circuits 7 and 8. The level detector 13 generates an output when the signal from the frequency-to-voltage converter 6 is equal to or smaller than a value corresponding to 25 Hz and feeds its output to the reset input of the flip-flop 17. The level detector 14 is designed to generate an output when the converter 6 output is equal to or smaller than a value corresponding to 17 Hz and feeds it to the reset input of the flip-flop 16. The level detector 15 is designed to produce an output when the converter 6 output is equal to or greater than a value corresponding to a frequency value of 37 Hz and feeds its output to the set input terminals of the flip-flops 16 and 17. The complementary output terminals ($\overline{Q}$) of flip-flops 16 and 17 are respectively connected to output terminals a and b.

With these circuit arrangements, the output terminal a remains at high voltage level when the input frequency is equal to or lower than 17 Hz and at low voltage level when the input frequency is equal to or higher than 37 Hz. Between these frequency values, the output state of the terminal a is high if the input frequency increases in a range from below 17 Hz, or low if that frequency decreases in a range from above 37 Hz. Likewise, the output terminal b assumes a high voltage state for a frequency range below 25 Hz or a low voltage state for a range above 37 Hz, and between these frequency values it takes on a high voltage state as the frequency increases from below 25 Hz or takes on a low voltage state as that frequency decreases from above 37 Hz. Therefore, the output conditions of the terminals a and b of the circuit of FIG. 5 assume similar binary states to those shown in Table III.

The embodiment of FIG. 5 has an advantage in that it permits the level detectors 13–15 to be constructed of inverting amplifiers of simple circuit configuration and provides ease with which the level setting is made.

Figure 6:
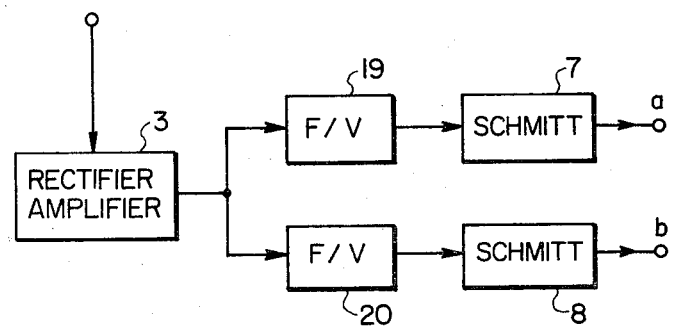

FIG. 6 is a further modification of the circuit 10 of FIG. 3. This modification differs from the circuit of FIG. 3 in that it comprises a pair of frequency-to-voltage converters 19 and 20, rather than a single frequency-to-voltage converter. It is well known in the art that the frequency-to-voltage converter has a nonlinear voltage output characteristic as a function of input frequency. Therefore, the use of a single frequency-to-voltage converter results in a plurality of different threshold levels being closely spaced apart from each other, causing an erroneous output signal to develop. According to the invention, the frequency-to-voltage converters 19 and 20 have different time constant values from each other so that the output of the converter 19 has clearly distinguishable levels for a range of frequencies between 15 Hz and 45 Hz, while the output of the converter 20 has clearly distinguishable levels for a frequency range of from 20 Hz to 45 Hz.

What is claimed is:

1. In a tape recording and reproducing apparatus including means for driving the tape at one of at least three predetermined speeds during recording and playback modes and means for recording a reference speed indicative signal in said tape during the recording mode, and means for generating a capstan speed indicative signal, a speed control system comprising:
    a transducer for reproducing said reference speed indicative signal from said tape during the playback mode, whereby the frequency of the reproduced speed indicative signal assumes one of a plurality of discrete values depending on deviation of the speed of said tape from the speed with which said reference speed signal is recorded in said tape;
    means connected to said transducer for converting the frequency of said reproduced speed indicative signal to a voltage signal;
    means connected to said converting means for comparing said voltage signal with a plurality of reference values representing different frequencies to generate a first speed control signal indicative of the deviation of the tape speed from said reference values; and
    means responsive to said first speed control signal and to said capstan speed indicative signal for generating a second speed control signal indicative of the difference therebetween for controlling the capstan
    wherein said predetermined speeds have ratios of 1:2:3, and wherein said comparing means comprises means for establishing first, second and third reference voltages to define a set of first, second, third and fourth voltage ranges, said third voltage range including a predetermined voltage which is derived when the playback tape speed equals the recording tape speed, and means for generating low-speed, medium-speed and high-speed control signals for application to said second speed control signal generating means when said voltage signal corresponds to said first, second and fourth voltage ranges, respectively.

2. A speed control system as claimed in claim 1, wherein said predetermined voltage corresponds to said speed indicative signal at 30 Hz, and wherein said first, second and third reference voltage correspond, respectively, to said speed indicative signal at a frequency between 15 Hz and 20 Hz, a frequency between 20 Hz and 30 Hz, and a frequency between 30 Hz and 45 Hz.

3. A speed control system as claimed in claim 1 or 2, wherein said comparing means comprises first and second Schmitt trigger circuits responsive to said voltage signal, each of said Schmitt trigger circuits having lower and higher threshold values, the lower and higher threshold values of said first Schmitt trigger circuit corresponding, respectively, to said first and third reference voltages, and the lower and higher threshold values of said second Schmitt trigger circuit corresponding, respectively, to said second and third reference voltages.

4. A speed control system as claimed in claim 1 and 2, wherein said comparing means comprises a plurality of level detectors for generating respective output signals, and first and second bistable devices responsive to said respective output signals to generate said low-speed, medium-speed and high-speed control signals.

5. A speed control system as claimed in claim 4, wherein said level detectors comprise a first level detector for generating an output signal when said voltage signal is lower than said first reference voltage, a second level detector for generating an output signal when said voltage signal is lower than said second reference voltage, and a third level detector for generating an output signal when said voltage signal is higher than said third reference voltage, and wherein said first bistable device has a reset input connected to receive said output signal of said first level detector and a set input connected to receive said output signal from said third level detector, said second bistable device having a reset input connected to receive said output signal of said second level detector and a set input connected to receive said output signal of said third level detector.

6. A speed control system as claimed in claim 3, wherein said frequency to voltage converting means comprises first and second frequency-to-voltage converters having their input terminals connected together to receive said reference speed indicative signal and having different nonlinear output characteristics as a function of frequency, the outputs of said frequency-to-voltage converters being connected respectively to said first and second Schmitt trigger circuits.

* * * * *